United States Patent
Raether et al.

(10) Patent No.: US 7,032,801 B2
(45) Date of Patent: Apr. 25, 2006

(54) FRICTION STIR TOOL FOR FRICTION WELDING

(75) Inventors: Klaus Raether, Hoehenkirchen (DE); Juergen Silvanus, Munich (DE); Werner Zimmermann, Putzbrunn (DE)

(73) Assignee: EADS Deutschland GmbH, Ottobrunn (DE)

( * ) Notice: Subject to any disclaimer, the term of this patent is extended or adjusted under 35 U.S.C. 154(b) by 0 days.

(21) Appl. No.: 10/486,555

(22) PCT Filed: Aug. 2, 2002

(86) PCT No.: PCT/DE02/02858

§ 371 (c)(1),
(2), (4) Date: Aug. 24, 2004

(87) PCT Pub. No.: WO03/015975

PCT Pub. Date: Feb. 27, 2003

(65) Prior Publication Data

US 2005/0001009 A1    Jan. 6, 2005

(30) Foreign Application Priority Data

Aug. 11, 2001   (DE)   ................ 101 39 687

(51) Int. Cl.
*B23K 20/12* (2006.01)
*B23K 37/00* (2006.01)

(52) U.S. Cl. ..................... 228/2.1; 228/112.1
(58) Field of Classification Search ............. 228/2.1, 228/112.1
See application file for complete search history.

(56) References Cited

U.S. PATENT DOCUMENTS

| 5,813,592 | A |   | 9/1998 | Midling et al. |
| 6,516,992 | B1 | * | 2/2003 | Colligan .................. 228/112.1 |
| 6,727,691 | B1 | * | 4/2004 | Goldfine et al. ............ 324/240 |
| 6,780,525 | B1 | * | 8/2004 | Litwinski .................... 428/615 |
| 2005/0040209 | A1 | * | 2/2005 | Stotler et al. ................ 228/102 |

FOREIGN PATENT DOCUMENTS

| EP | 1075892 | A2 |   | 2/2001 |
| JP | 2000-301361 |   |   | 10/2000 |
| JP | 2000-301361 | A | * | 10/2000 |
| WO | WO 95/26254 |   |   | 10/1995 |

* cited by examiner

*Primary Examiner*—Lynne R. Edmondson
(74) *Attorney, Agent, or Firm*—Crowell & Moring LLP

(57) ABSTRACT

A friction welding tool for friction welding can be controlled with respect to measuring accuracy based upon the temperature in the weld zone. This is attained by determining the temperature values of the weld zone by way of a temperature sensor, which is arranged with its measuring point in the pin of the stir welding tool.

10 Claims, 1 Drawing Sheet

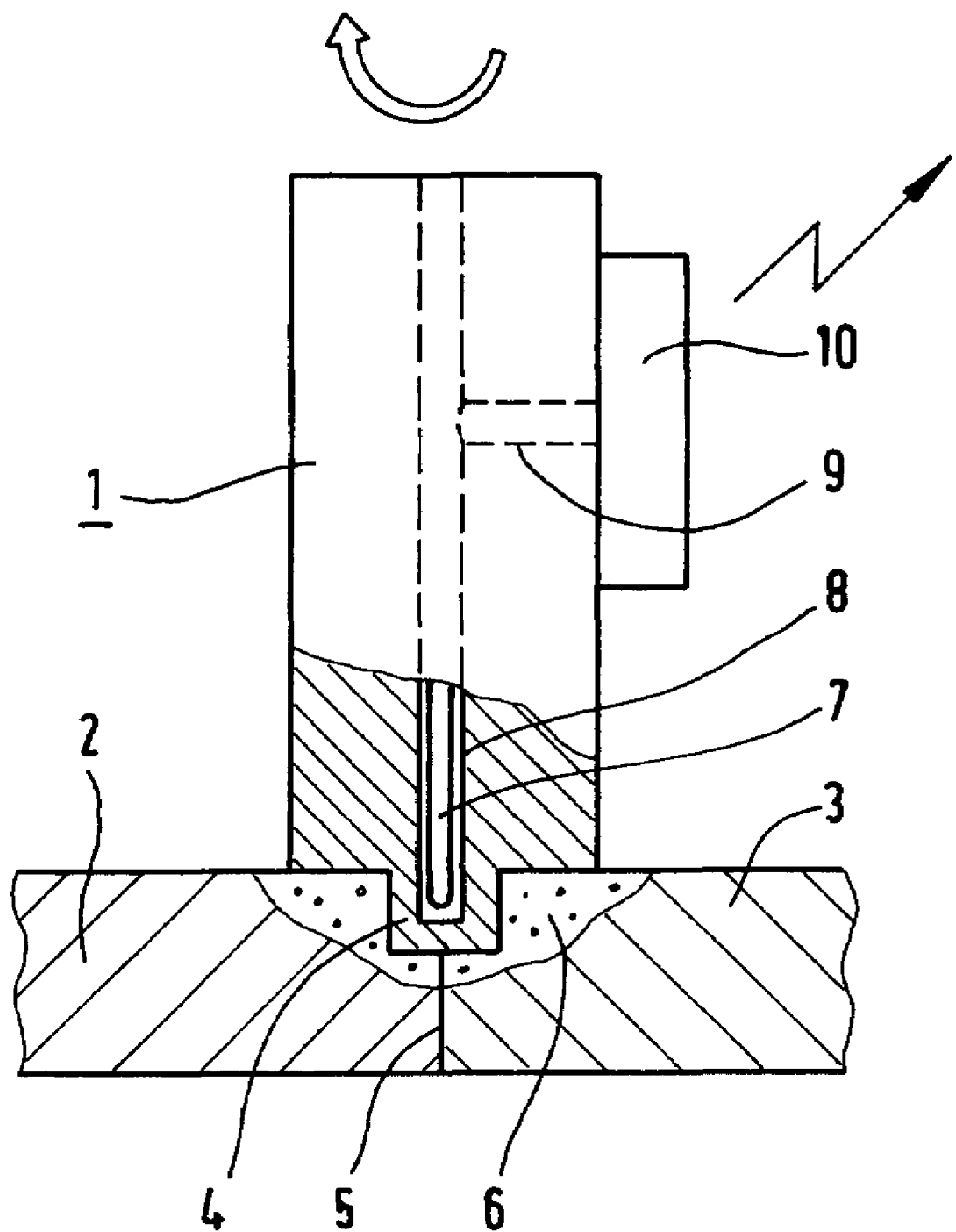

FRICTION STIR TOOL FOR FRICTION WELDING

BACKGROUND AND SUMMARY OF THE INVENTION

The present invention concerns a friction stir welding tool for friction welding.

A friction welding process is described, for example, in international publication WO 95/26254 A1. To produce a good welded connection, this publication discloses guiding a friction stir welding tool with vertical pressure along the connecting point of the workpiece to be welded. It is particularly advantageous to provide the friction stir welding tool with a concave shoulder and a pin configured in a screw shape.

Also of great importance in friction stir welding is the adjustment of a temperature that is suitable for the welding procedure in the stirred material of the weld zone. This temperature is influenced, among other things, by the parameters of the welding process, such as the rate of feed, the number of revolutions, and the contact pressure of the friction stir welding tool. Also known is a process of influencing by means of cooling devices if necessary.

It is known in friction stir welding to measure the temperature in the stirred material of the weld zone in order to control the welding procedure in accordance with the measured temperature values.

One known measuring process consists of recording the temperature of the welded plates in the vicinity of the weld zone. Since the plates cool off considerably a short distance from the weld zone, the temperature of the stirred material of the weld zone cannot be determined with sufficient accuracy with this measuring process.

Another known measuring method for determining the weld zone temperature consists of using a pyrometer. As an optical radiation measurement, this measuring method is impaired in its measurement accuracy by the structured surface of the welding location.

Such pyrometers are also used for the online monitoring of the quality of roll welding joints or mash seam welding joints as is described, for example, in European publication EP 1 075 892 A2.

One object of the invention is to create a friction stir welding tool for friction welding that can be controlled with sufficient measuring accuracy based upon the temperature in the weld zone.

This object is attained in accordance with the invention. Further developments of the invention are also disclosed.

In the temperature measuring process of the invention, the temperature of the weld zone is recorded by means of a temperature measuring device whose measuring element is arranged in the pin of the friction stir welding tool.

The measurement location is separated from the weld zone only by the thermally conductive wall of the pin, and a good correspondence can therefore be achieved between the measured and the actual temperature values of the weld zone.

BRIEF DESCRIPTION OF THE DRAWINGS

One exemplary embodiment of the invention will be explained in more detail below with reference to the drawing. The drawing shows a section view through a friction stir welding tool.

DETAILED DESCRIPTION OF THE INVENTION

Two plates 2 and 3 that come into butt joining contact with each other are welded together, for example, with the friction stir welding tool 1. The pin 4 of the friction stir welding tool is stirred into the two plates 2 and 3 by means of a pressure, rotation, and forward motion of the stirring tool in a known manner, along the contact joint 5. After cooling, the stirred material forms the weld seam in the weld zone 6 that is produced in this manner.

The stirring tool 1 is provided with a blind bore 8, which ends in a pin 4, and wherein a temperature sensor 7 can be accommodated. The electric connections for the sensor are guided via a radial bore 9 to a telemetric measuring system 10, which is arranged on the surface of the stirring tool underneath its clamping area.

The temperature sensor 7 can be configured, for example, as a standard thermal element. An electronic evaluation system for the thermal element and a transmitter equipped with a suitable receiver for the telemetric transmission of the measured temperature values to the control unit of the stirring tool are accommodated in the telemetric measuring system 10. The electric current to the electronic evaluation system and the transmitter is supplied by means of a battery, which is accommodated in the measuring system 10.

The telemetric transmission can be implemented by means of different processes known to an expert in the field, for example, within the VHF range by means of microwaves or within the infrared range.

An alternative for the temperature sensor 7 is provided by introducing a sapphire rod or an optical fiber instead of the thermal element into the blind bore 8, with which the thermal radiation existing in the pin is optically transmitted to a pyrometer, which is accommodated in the measuring system 10, and which feeds the temperature measured values following electronic processing to the VHF transmitter.

The invention claimed is:

1. A friction stir welding tool for friction welding having a control that takes into consideration measured temperature values of a weld zone, wherein the temperature values of the weld zone are determined by a temperature sensor that is arranged in a pin of the friction stir welding tool.

2. The friction welding tool of claim 1, wherein the temperature sensor is integrated in an autarchic telemetric measuring system located on the tool, which continuously transmits the measured temperature values to a control unit of the tool located outside of the friction stir welding tool.

3. The friction stir welding tool of claim 1, wherein the temperature sensor is a thermal element.

4. The friction stir welding tool of claim 1, wherein the temperature sensor is a pyrometer having a sapphire rod ending in the pin or an optical fiber ending in the pin.

5. The friction stir welding tool of claim 2, wherein the temperature sensor is a thermal element.

6. The friction stir welding tool of claim 2, wherein the temperature sensor is a pyrometer having a sapphire rod ending in the pin or an optical fiber ending in the pin.

7. A process of determining temperature values of a weld zone of a friction stir welding tool for friction welding having a control that takes into consideration the temperature values of the weld zone, comprising measuring the temperature values of the weld zone by a temperature sensor that is arranged in a pin of the friction stir welding tool.

8. The process of claim 7, wherein the temperature sensor is integrated in an autarchic telemetric measuring system located on the tool, which continuously transmits the measured temperature values to a control unit of the tool located outside of the friction stir welding tool.

9. The process of claim 7, wherein the temperature sensor is a thermal element.

10. The process of claim 7, wherein the temperature sensor is a pyrometer having a sapphire rod ending in the pin or an optical fiber ending in the pin.

* * * * *